United States Patent [19]

Bacigalupe et al.

[11] Patent Number: 4,882,981

[45] Date of Patent: Nov. 28, 1989

[54] CONTINUOUS PROOF AND BAKE APPARATUS HAVING IMPROVED CONVEYOR SYSTEM

[75] Inventors: Carlos Bacigalupe, The Colony; Michael J. Dobie, Plano, both of Tex.

[73] Assignee: Stewart Systems, Inc., Plano, Tex.

[21] Appl. No.: 192,914

[22] Filed: May 12, 1988

Related U.S. Application Data

[62] Division of Ser. No. 127,372, Dec. 2, 1987.

[51] Int. Cl.⁴ .......................... A21B 1/42; A21D 6/00
[52] U.S. Cl. ........................................ 99/479; 99/483; 198/778; 198/838
[58] Field of Search .......... 99/467, 468, 483, 477–479, 99/443 C; 34/207; 126/21 A, 21 R; 198/778, 838, 852; 432/133, 176, 222

[56] References Cited

U.S. PATENT DOCUMENTS

| | | | |
|---|---|---|---|
| 3,269,142 | 8/1966 | De Mola et al. | 198/778 X |
| 3,363,744 | 1/1968 | Green et al. | 198/778 |
| 4,269,302 | 5/1981 | Garvey | 198/778 X |
| 4,608,961 | 9/1986 | Lanham et al. | |
| 4,631,029 | 12/1986 | Lanham et al. | |
| 4,726,766 | 2/1986 | Stewart et al. | |
| 4,729,470 | 3/1988 | Bacigalupe et al. | 99/479 X |

Primary Examiner—Timothy F. Simone
Attorney, Agent, or Firm—Michael A. O'Neil

[57] ABSTRACT

A conveyor system (28–30) includes a track (110) and a conveyor chain (70) for movement along the track. The conveyor chain comprises a plurality of identical links (72) each including a first connection member (74), spaced, parallel, longitudinally extending plates (76) and a second connection member (78). The plates are connected to the connection members for pivotal movement about vertical axes, and the connection member of adjacent links are connected to each other for pivotal movement about horizontal axes thereby accommodating horizontal and vertical flexure of the conveyor chain. The conveyor chain (70) is actuated by a drive mechanism (180) including a drive chain (198) and chain engaging members (206) carried thereby which engage the conveyor chain along an arc having a substantial radius, thereby propelling the conveyor chain through the track (110) without subjecting the conveyor chain to periods of high acceleration.

1 Claim, 9 Drawing Sheets

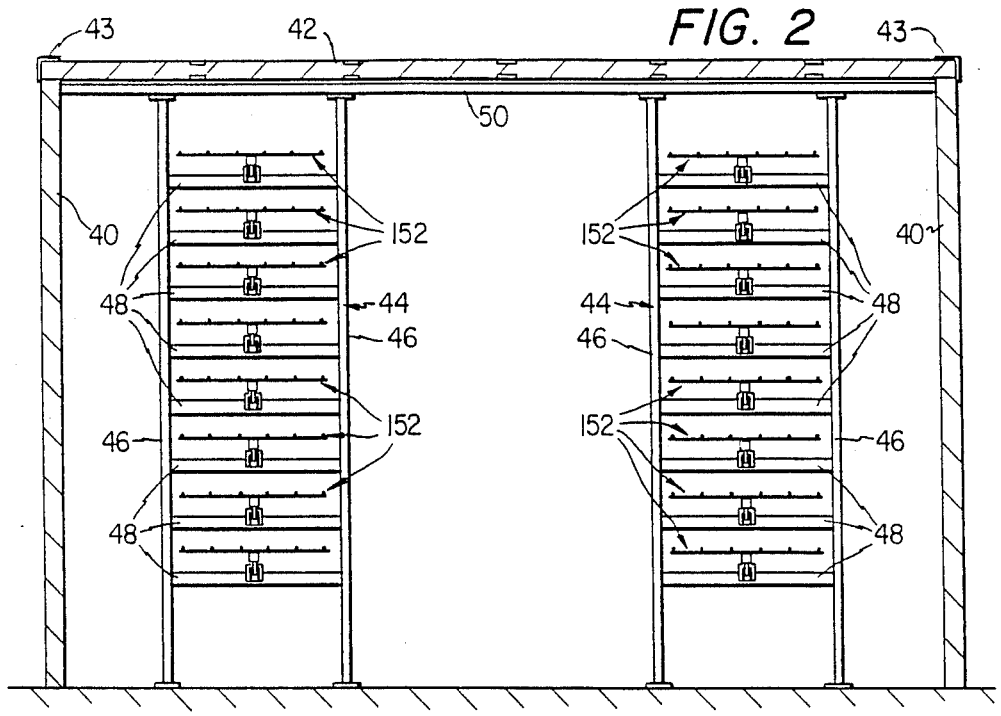
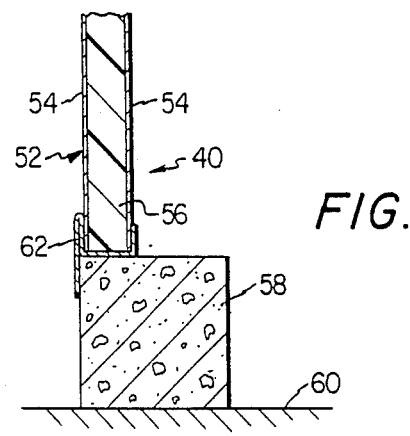
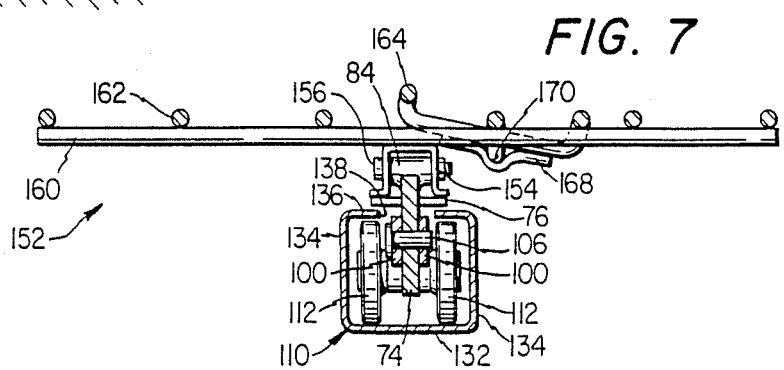

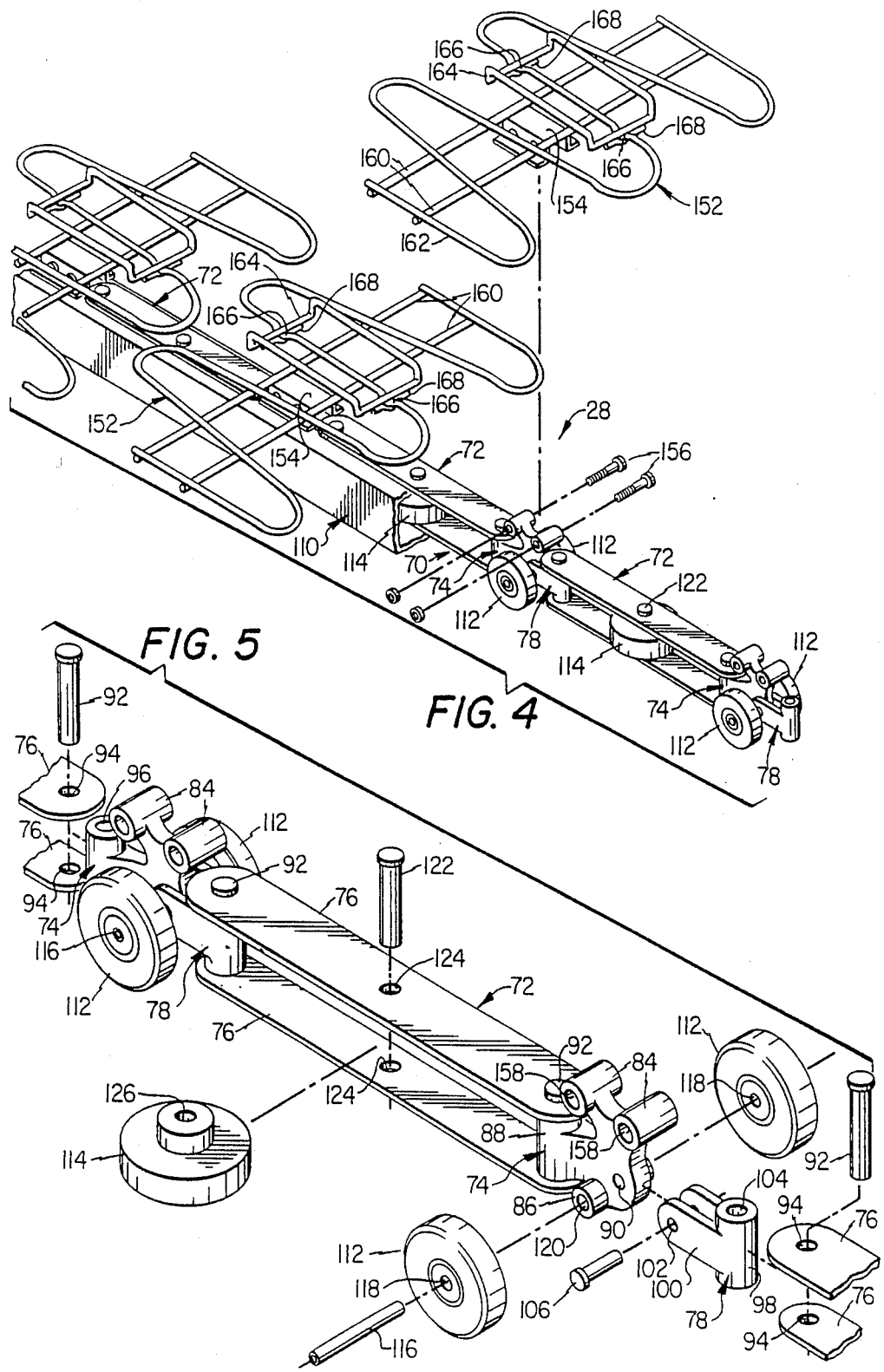

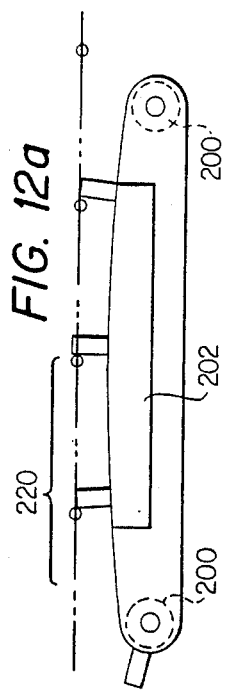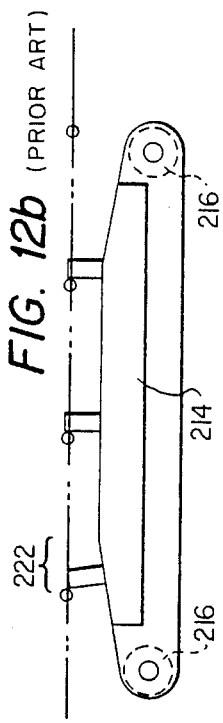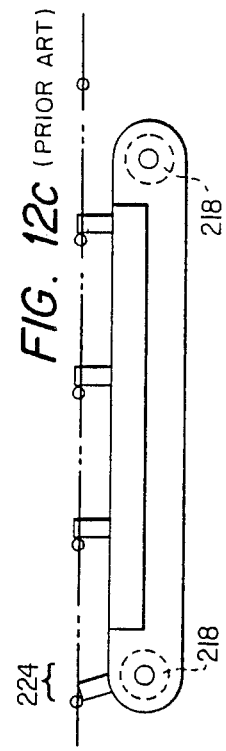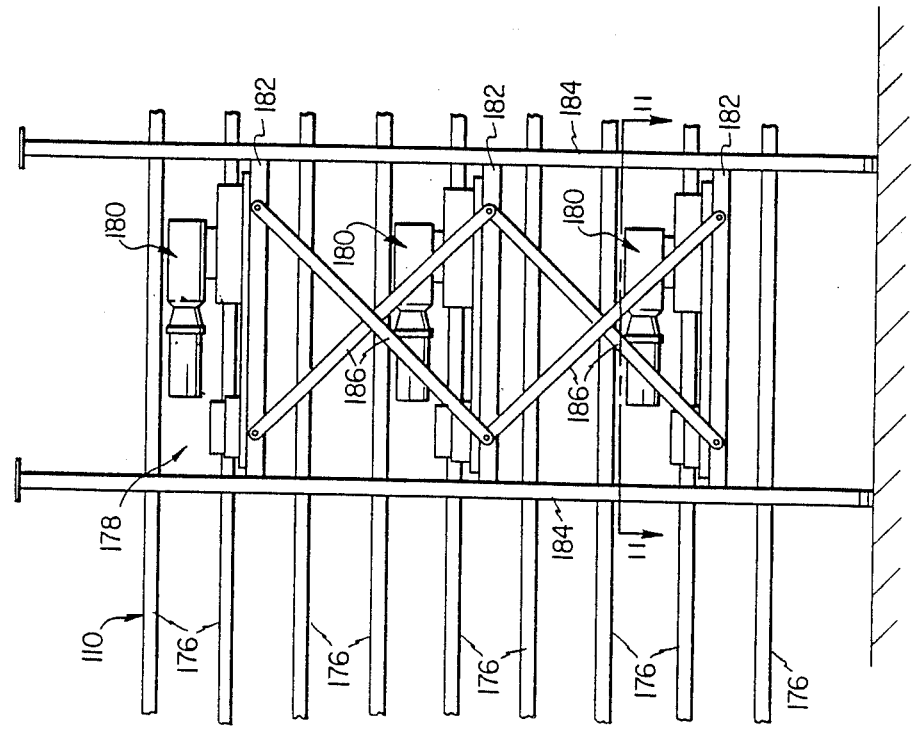

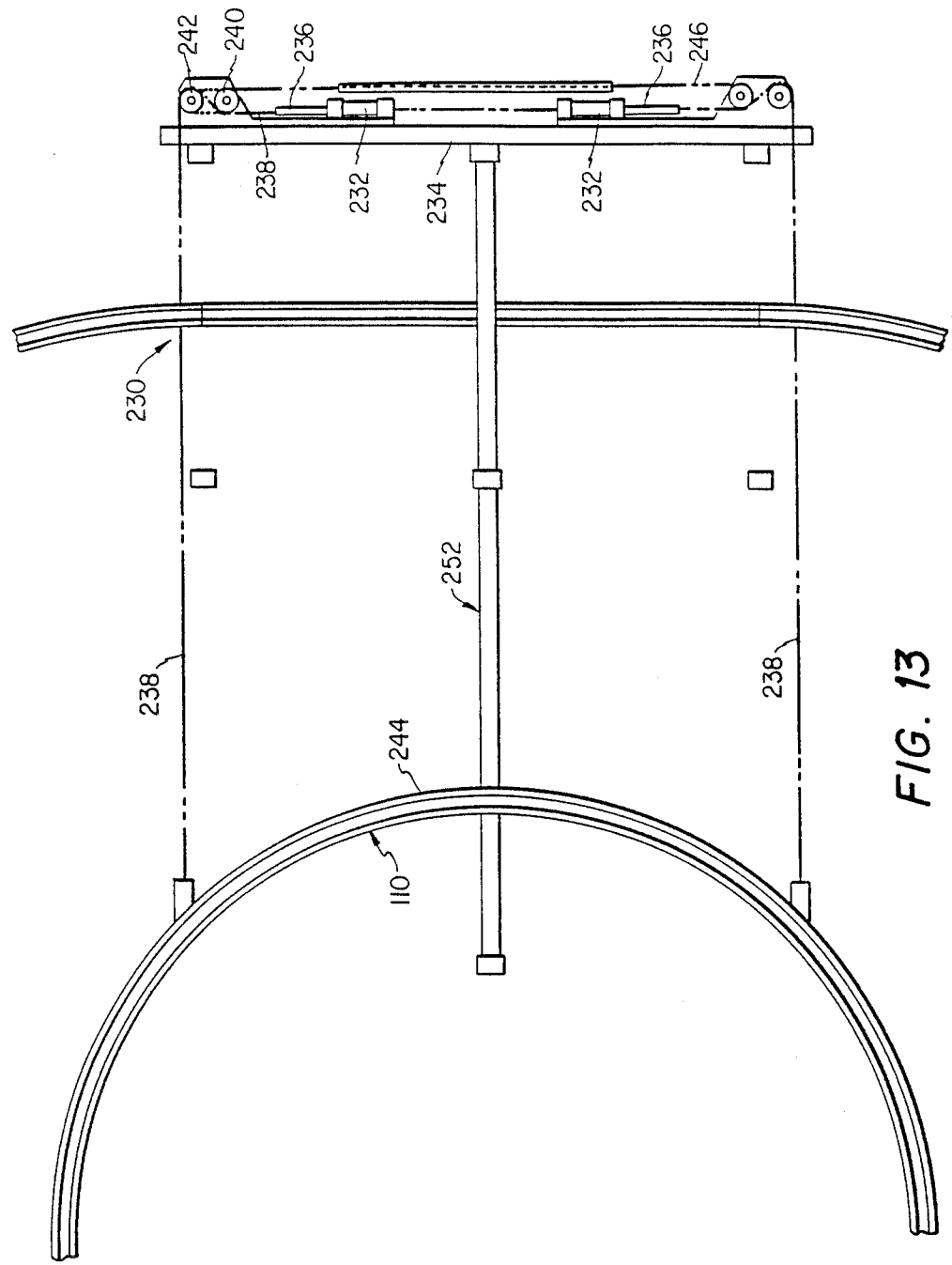

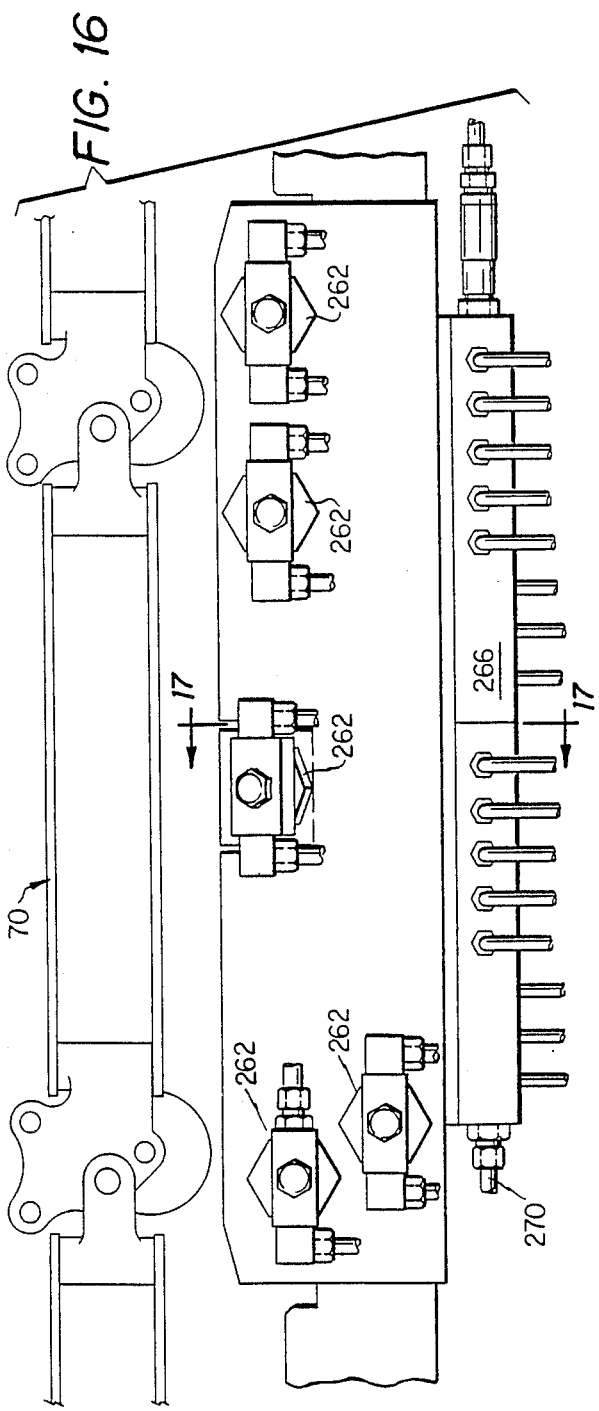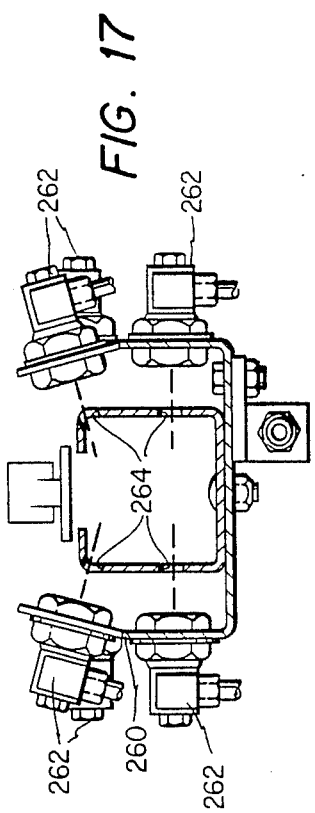

CONTINUOUS PROOF AND BAKE APPARATUS HAVING IMPROVED CONVEYOR SYSTEM

This is a divisional of application Ser. No. 07/127,372 filed Dec. 2, 1987.

TECHNICAL FIELD

This invention relates generally to continuous proof and bake apparatus for use in bakeries and similar applications and more particularly to an improved conveyor system which is particularly adapted to use in continuous proof and bake apparatus.

BACKGROUND AND SUMMARY OF THE INVENTION

In the commercial baking industry, the term "proofing" refers to the procedure of exposing dough products to a predetermined temperature and humidity environment and thereby causing the dough to rise. Apparatus for accomplishing this function is generally referred to as a proofing box or proofer. Following the proofing operation, the dough products are transferred to an oven for baking.

Traditionally, the proofing and baking functions have been entirely separate steps. More recently, various manufacturers have introduced continuous proof and bake apparatus wherein dough products are transferred directly from the proofer to the oven. Although the various types of proof and bake appartus that have been used heretofore have received commercial acceptance, a need exists for still further improvements in the art. In particular, improvements relating to the construction and operation of conveyor systems utilized in continuous proof and bake apparatus are required in order to provide improved reliability and reduced maintenance costs.

The present invention comprises a conveyor system particularly adapted for use in continuous proof and bake apparatus which fulfills the foregoing and other requirements long since found wanting in the prior art. In accordance with one aspect of the invention, the conveyor system incorporates a conveyor chain comprising a plurality of identical links each including first and second connection members and spaced, parallel, longitudinally extending plates. The plates are joined to the connection members by vertically disposed pins to facilitate horizontal flexure of the conveyor chain, and the connection members of adjacent links are joined by horizontally disposed pins to permit vertical flexure. Vertically disposed rollers are mounted on the first connection member of each link, and a horizontally disposed roller is mounted between the plates of each link. The rollers facilitate the movement of the chain through an elongate track characterized by a bottom wall, spaced apart side walls and a top wall having a longitudinally extended slot formed therein.

One of the longitudinally extending plates of each link of the chain is positioned on the outside of the track and serves to prevent debris from entering the track through the longitudinally extending slot. Each link of the chain carries a product supporting grid which is connected to the chain by means of a cover member extending between the longitudinally extending plates of adjacent links of the chain for cooperation therewith to prevent debris from entering the track. Each product supporting grid comprises a pair of transverly extending rods secured to the cover member and a W-shaped rod supported on the transversely extending rods to provide a bakery pan support surface. Each product supporting grid is provided with a rocker which serves to retain bakery pans in engagement with the grid during movement thereof along the track under the action of the conveyor chain.

In accordance with another aspect of the invention, the conveyor chain is actuated by a drive mechanism including a drive motor which is drivingly connected to a drive chain through a speed reducer. The drive chain engages the conveyor chain along an arc characterized by a very large radius. In this manner power is transfered from the drive motor through the speed reducer and the drive chain to the conveyor chain without causing the conveyor chain to experience periods of rapid acceleration which are characteristic of prior drive chain designs.

DESCRIPTION OF THE DRAWINGS

A more complete understanding of the invention may be had by reference to the following Detailed Description when taken in conjunction with the accompanying Drawings wherein:

FIG. 2 is a transverse sectional view of the oven of the continous proof and bake apparatus showing the construction thereof.

FIG. 3 is an illustration of the construction of part of the proofer of the apparatus of FIG. 1;

FIG. 4 is an exploded partial perspective view of the conveyor system of the continuous proofing and baking apparatus of FIG. 1;

FIG. 5 is an enlarged partial exploded view similar to FIG. 4;

FIG. 7 is a sectional view taken along the line 7—7 in FIG. 6 in the direction of the arrows;

FIG. 10 is a partial side view of the conveyor system illustrating the drive mechanism thereof;

FIGS. 12a, 12b and 12c are illustrations of the operating characteristics of various types of conveyor drive systems;

FIG. 13 is an illustration of the apparatus utilized to operate the portion of the tract that is used to induce tension in the conveyor chain

FIG. 16 is an exploded view of the conveyor chain lubricating mechanism utilized in the conveyor system of FIGS. 4 and 6;

FIG. 17 is a sectional view taken along the line 17—17 in FIG. 16 in the direction of the arrows.

DETAILED DESCRIPTION

Figure 1:
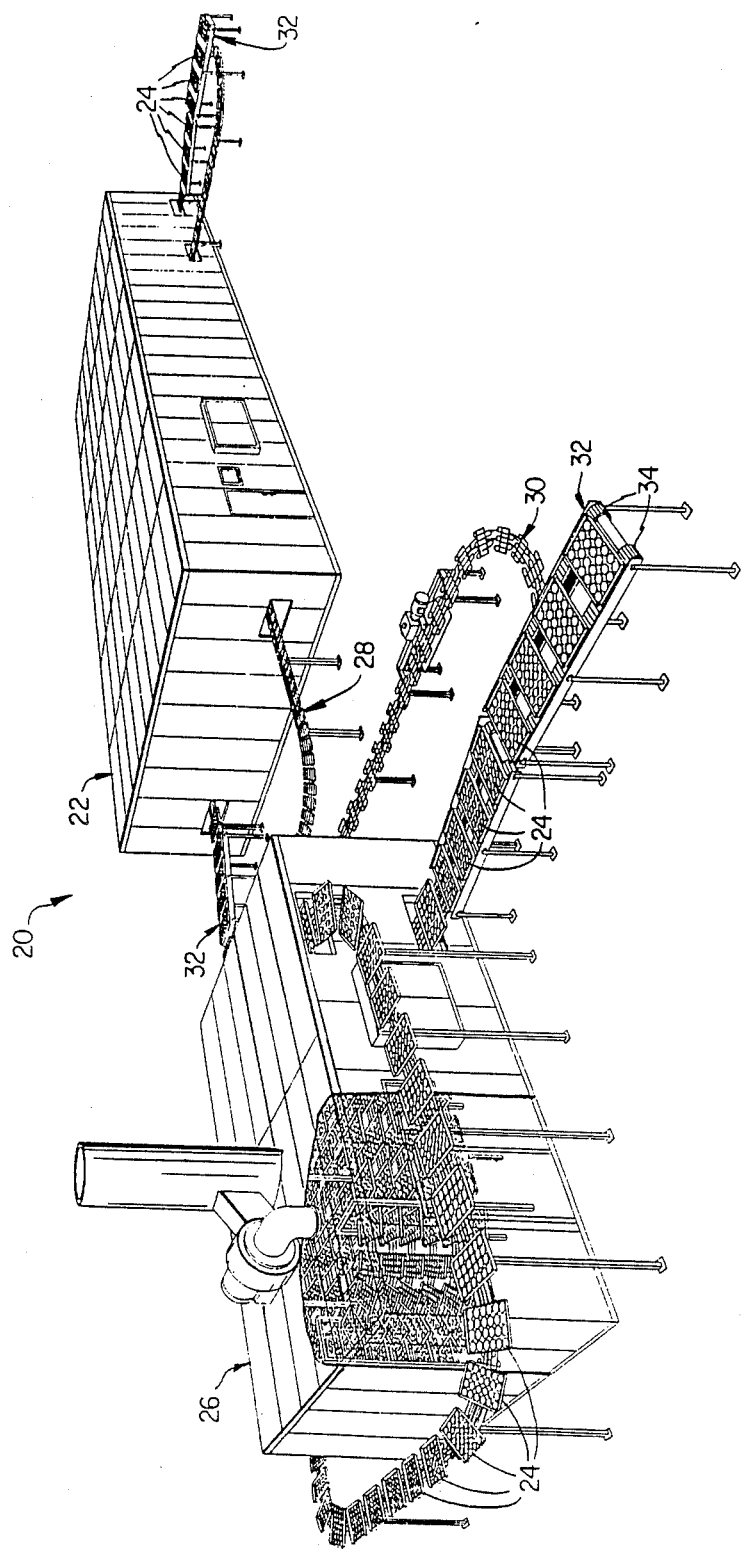
FIG. 1 is a perspective view of a continuous proof and bake apparatus incorporating the invention.

Referring now to the Drawings, and particularly to FIG. 1 thereof, there is shown a continuous proof and bake apparatus 20 incorporating the present invention.

The continuous proof and bake apparatus 20 includes a proofer 22 wherein dough products carried on conventional bakery pans 24 are exposed to a predetermined temperature and humidity environment, thereby causing the dough to rise. The continuous proof and bake apparatus 20 further includes an oven 26 which receives the dough products from the proofer 22 which function to bake the dough products.

The proofer 22 includes a conveyor system 28, and the oven 26 includes a conveyor system 30 each constructed in accordance with the present invention. A plurality of transfer conveyors 32 are utilized to initially place the bakery pans 24 onto the conveyor system 28, to transfer the bakery pans 24 from the conveyor system 28 to the conveyor system 30, and to finally remove the bakery pans 24 from the conveyor system 30. Each transfer conveyor 32 comprises spaced apart belts 34 extending from a level substantially above the plane of the conveyor systems 28 and/or 30 to a level substantially below the plane of the conveyor system, thereby implementing the transfer of bakery pans to and from the conveyor systems 28 and 30.

As is typical in continuous proof and bake appartus, the conveyor system 28 travels in a spiral path through the proofer 22 and the conveyor system 30 travels in a spiral path through the oven 26. Referring to FIG. 2, the proofer 22 and the oven 26 each comprise side walls 40 and a top wall 42 extending there between. A plurality of ladders 44 are located within the proofer 22 and within the oven 26 and serve to support the conveyor systems 28 and 30 thereof. Each ladder 44 comprises a pair of spaced apart up-rights 46 and a plurality of cross members 48 which support the conveyor system thereon. The ladders 44 also support beams 50 which support the roof 42. Particularly in the case of gas-fired ovens, the roof 42 is loosely supported on the beams 50 so that in case of an explosion the roof can simply move upwardly to release the resulting pressure surge and thereby minimizing damage to the component parts of the continuous proof and bake appartus 20. Angles 43 prevent the loosely supported roof from moving in a horizontal plane, while allowing the roof 42 to move upward in the event of an explosion.

As is best shown is FIG. 3, the proofer 22 comprises side walls 40 formed from panels 52 each comprising metal exterior surfaces 54 and a core 56 formed from a thermally insulative material. Because of the high humidity conditions that are typically maintained in a proofer, condensation often occurs during or following the operation thereof. For this reason it has been found to be advantageous to support the walls 40 of the proofer 22 on concrete curbs 58 thereby eliminating the corrosion that might occur if the panels 52 were exposed to condensation accumulating on the floor 60 of the proofer 22. The panels 52 are secured to the curb 58 by brackets 62 and are preferably interconnected by means of tongue and groove joints.

The construction of the conveyor system 28 of the proofer 22 is illustrated in FIGS. 4 through 7, inclusive, it being understood that the conveyor system 30 of the oven 26 is identical in construction and operation to the conveyor system 28. The conveyor system 28 includes a conveyor chain 70 comprising a plurality of idential links 72 which are connected end to end to form the chain 70. Each link 72 comprises a first connection member 74 situated at one end thereof a pair of spaced, parallel, longitudinally extending plates 76, and a second connection member 78 located at the opposite end thereof.

The first connection member 74 of each link 72 comprises spaced, parallel, upper horizontally disposed bosses 84, a lower horizontally disposed boss 86, a vertically disposed boss 88 situated at one end thereof and an aperture situated at the opposite end thereof. The spaced, parallel, longitudinally extending plates 76 of each link 72 are secured to the first connection member 74 thereof by a pin 92 which is received through apertures 94 formed in the spaced, parallel, longitudinally extending plates 76 and an aperture 96 formed in the boss 88 of the first connection member 74.

The second connection member 78 of each link 72 comprises a vertially oriented boss 98 and a pair of longitudinally extending arms 100 extending from the boss 98 and having aligned apertures 102 formed therein. A vertically oriented pin 92 is received through aligned apertures 94 formed in the spaced, parallel, longitudinally extending plates 76 and in an aperture 104 extending through the vertically oriented boss 98 to secure the second connection member 78 to the spaced, parallel longitudinally extending plates 76. The use of the vertically oriented pins 92 to connect the spaced, parallel, longitudinally extending plates 76 to the connection members 74 and 78 allows the chain 70 to flex in the horizontal plane.

The conveyor chain 70 is assembled by positioning the portion of each first connection member 74 having the aperture 90 formed therein between the longitudinally extended arms 100 of the second connection member 78 of the next adjacent link 72. A horizontally disposed pin 106 is then extended through the aligned apertures 102 of the second connection member 78 and the aperture 90 of the first connection member 74, thereby securing adjacent links 72 of the conveyor chain 70 one to the other. The use of the horizontally disposed pin 106 to connect adjacent links 72 of the chain 70 allows flexure of the conveyor chain 70 in the vertical plane.

The conveyor chain 70 travels through a track 110. To facilitate the movement of the conveyor chain 70 through the track 110, each link 72 of the conveyor chain 70 is provided with a pair of vertically disposed rollers 112 and a horizontally disposed roller 114. The vertically disposed rollers 112 are secured to the first connection member 74 by a pin 116 which is received through apertures 118 formed in the vertically disposed rollers 112 and an aperture 120 extending through the lower horizontally disposed boss 86 of the first connection member 74. The horizontally disposed roller 114 of each link 72 is secured between the spaced, parallel, longitudinally extending plates 76 thereof by a pin 122 which is received through aligned apertures 124 formed in the spaced, parallel, logitudinally extending plates 76 and an aperture 126 extending through the horizontally disposed roller 114.

Figure 8:
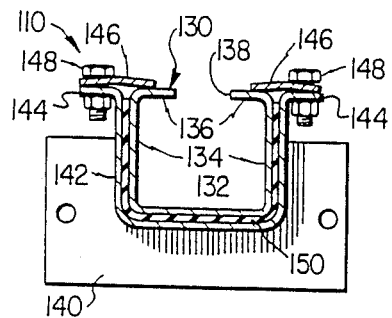
FIG. 8 is a sectional view taken along the line 8—8 in FIG. 6 in the direction of the arrows.
Figure 6:
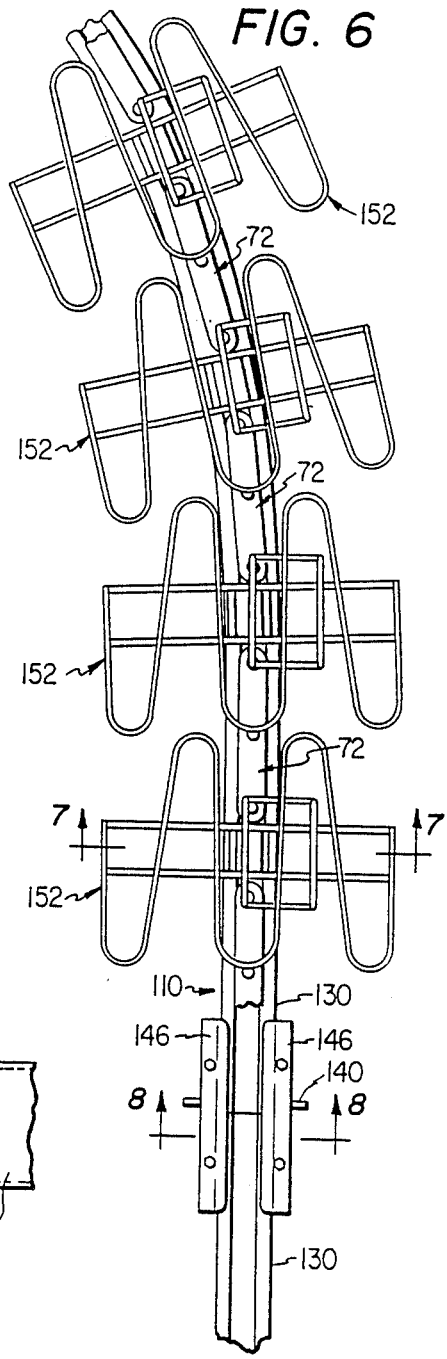
FIG. 6 is a partial top view of the conveyor apparatus.
Figure 9:
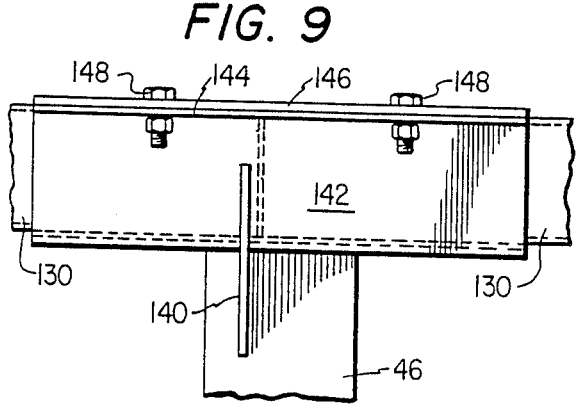
FIG. 9 is a side view of the apparatus used to connect adjacent sections of the track of the conveyor apparatus of FIGS. 4 and 6.

Refering to FIGS. 6, 8 and 9, the track 110 comprises a series of sections 130 which are connected end to end. Each section 130 of the track 110 has a horizontally disposed bottom wall 132 extending to spaced apart, vertically disposed side walls 134. The vertically disposed side walls 134 in turn extend to horizontally disposed top wall portions 136 which are separated by longitudinally extending gap 138.

FIGS. 8 and 9 illustrate the interconnections between adjacent sections 130 of the track 110. A bracket 140 is secured to one of the cross members 48 of one of the ladders 44 by suitable fasteners. The bracket 140 supports a U-shaped connection member 142 which extends between the end portions of adjacent sections 130 of the track 110. The U-shaped connection member 142 has outwardly turned flanges 144. Top plates 146 are secured to the outwardly turned flanges 144 of the U-shaped connection member 142 by fasteners 148 and function to clamp the end portions of the sections 130 in engagement with U-shaped connection member 142. An elastomeric gasket 150 is trapped between the end portions of the sections 130 of the track 110 and the U-shaped connection member 142. The function of the elastomeric gasket 150 is to prevent lubricant contained within the track 110 from leaking onto bakery products carried on lower tiers of the track 110.

Referring again to FIG. 4, the function of the conveyor chain 70 is to carry product supporting grids 152 along the track 110. All of the components of each link 72 of the conveyor chain 70 are contained within the track 110, with the exception of one of the spaced, parallel, longintudinally extending plates 76 and the spaced, parallel, upper horizontally disposed bosses 84. The upper plate 76 of each link 72 is positioned above the top wall portions 136 of the track sections 130 and therefore serves to prevent debris from entering the track 110 through gap 138. As is best shown in FIG. 7, each of the product supporting grids comprises a cover member 154 which serves to connect the product supporting grid 152 to the spaced, parallel, upper horizontally disposed bosses 84 of one of the first connection member 74 of the link 72. The cover members 154 extend between and overlap the spaced, parallel longitudinally extending plates 76 of adjacent links 72 for cooperation therewith to prevent debris from entering the track 110. The cover member 154 and the bosses 84 are secured together by fasteners 156 which extend through apertures formed in the cover members 154 and apertures 158 formed in the spaced, parallel, upper horizontally disposed bosses 84.

Each product supporting grid 152 further comprises transversely extending rods 160 secured to the cover members 154. A rod 162 bent into a W-shaped configuration is in turn supported on the transversely extending rods 160. Each product supporting grid 152 includes a rocker 164. Comprising a rod bent into a rectangular configuration as is illustrated in FIG. 4, the rocker 164 may be secured to the rod 162 by forming downwardly extending portions 166 in the rod 162 and utilizing brackets 168 to secure the rocker 164 in engagement therewith. An alternative contruction is illustrated in FIG. 7 wherein the brackets 168 which secures the rocker 164 in engagement with rod 170 are attached to the underside of the transversely extending rods 160.

The function of the rocker 164 is to retain bakery pans in engagement with the product supporting grid 152 during movement thereof along the track 110. In the case of a bakery pan having an even number of compartments, the rocker 164 is positioned as illustrated in FIG. 7. One of the compartments of the bakery pan engages the offset portion of the rocker 164, thereby forcing the center portion upwardly into the gap between the centermost compartments of the bakery pan 24. In the case of a bakery pan 24 having an odd number of compartments, the compartment in the center thereof engages the centermost portion of the rocker 164 thereby forcing the offset portion upwardly into the gap extending between offset compartments of the bakery pan 24. In this manner a single rocker configuration can be utilized to secure any conventional bakery pan 24 in engagement with the product supporting grid 152.

Referring now to FIG. 10, the track 110 comprises a series of tiers 176. The conveyor chain 70 is driven by a drive system 178 comprising a plurality of conveyor drive mechanisms 180. The drive mechanisms may engage the conveyor chain 70 at any selected tier 176 depending on the power requirements of the conveyor system. The conveyor drive mechanisms 180 are supported on shelves 182 which in turn are supported by uprights 184 and interconnected by cross-braces 186.

Figure 11:
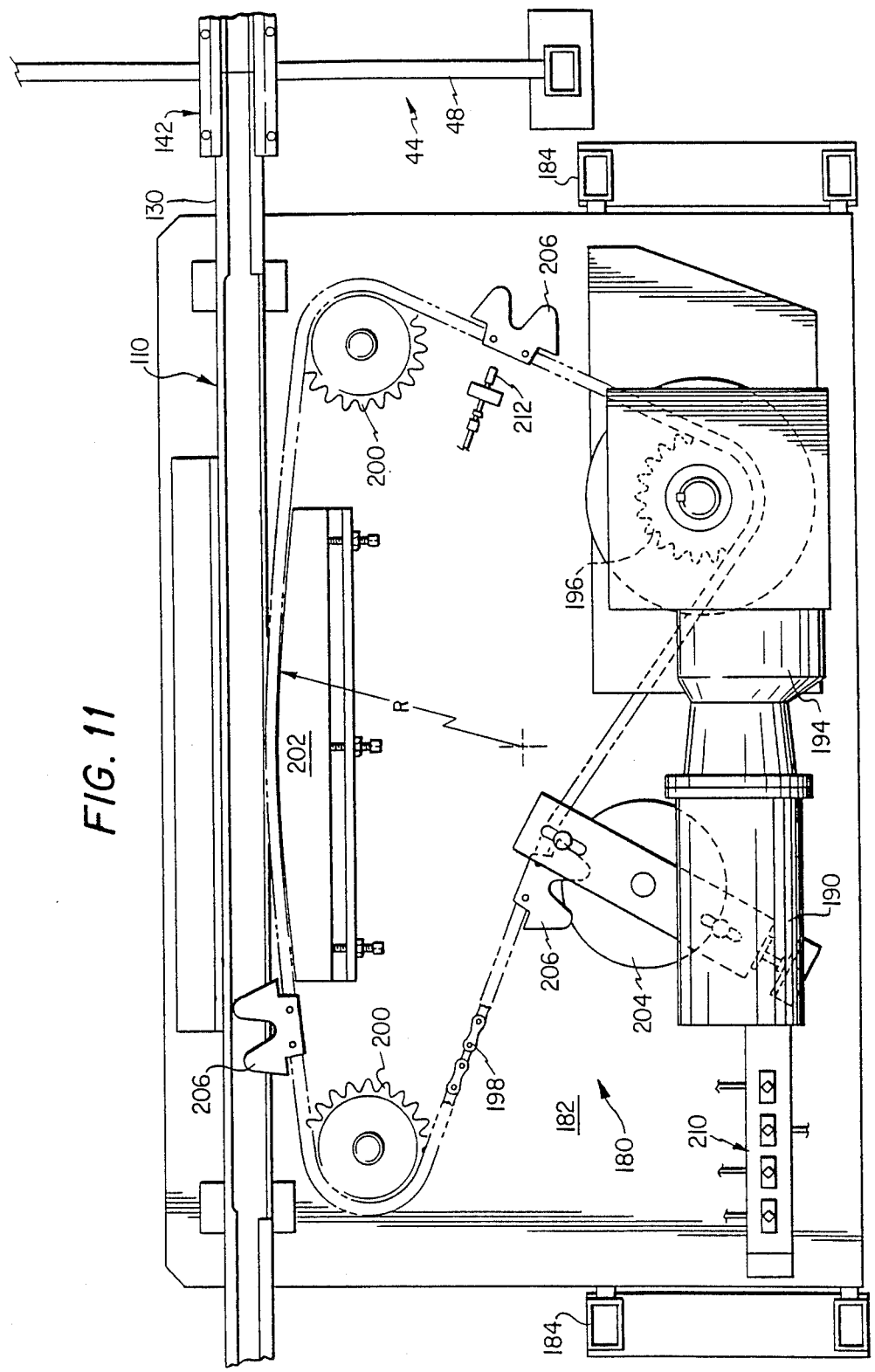
FIG. 11 is a view taken along the line 11—11 in FIG. 10 in the direction of the arrows illustrating the operation of the drive mechanism.

As is best shown in FIG. 11, each conveyor drive mechanism 180 includes a drive motor 190. A speed reducer 194 drivingly connects the output of the drive motor to a drive sprocket 196. A drive chain 198 is constrained around a course defined by the drive sprocket 196, idler sprockets 200, a guide member 202, and a chain tensioner 204. The drive chain 198 carries a plurality of chain engaging members 206 which are configured and positioned to engage the conveyor chain 70 at pre-determined points thereon, preferably the points at which the pins 122 extend through the spaced, parallel, longitudinally extending plates 76 of the links 72. Thus, upon actuation, the drive motor 190 operates through the speed reducer 194, the drive sprocket 196, the drive chain 198 and the chain engaging members 206 to propel the conveyor chain 70 through the track 110.

The drive mechanism 180 further includes a lubrication system 210. The lubrication system 210 directs a lubricant spray onto the drive chain 198 through a nozzle 212. The lubrication system 212 also functions to provide lubricant to the idler sprockets 200 and the chain tensioner 204.

The idler sprockets 200 are positioned in a substantially spaced apart relationship with respect to the track 110. The guide member 202 defines a radius of curvature R which is preferably about 14 feet. This configuration for engagement between the drive chain 198 having the chain engaging members 206 mounted thereon and the conveyor chain 70 has been found to be highly advantageous in the practice of the invention.

Referring to FIGS. 12a, 12b and 12c, the drive chain/conveyor chain arrangement of the present invention is illustrated in FIG. 12a. Two prior art drive chain/conveyor chain arrangements are illustrated in FIGS. 12b and 12c. In FIG. 12b there is shown a drive chain/conveyor chain arrangement whereby a ramped cam 214 extends between sprockets 216. In FIG. 12c the drive chain engages the conveyor chain along a straight line extending between sprockets 218.

The drive chain/conveyor chain arrangement of the present invention as illustrated in FIG. 12a provides for a gradual acceleration of the conveyor chain through a relatively long interval 220. The drive chain/conveyor chain arrangement of FIG. 12b provides greater acceleration through a relatively short interval 222, resulting in erratic conveyor chain operation. Likewise, the drive chain/conveyor chain arrangement of FIG. 12c provides for more rapid acceleration through the short interval 224, again resulting in erratic conveyor chain operation. It has been found that erratic conveyor chain operation caused by the drive chain/conveyor chain arrangements of FIGS. 12b and 12c lead to conveyor chain breakdown causing unnecessary downtime of the overall system and high maintenance costs.

Figure 14:
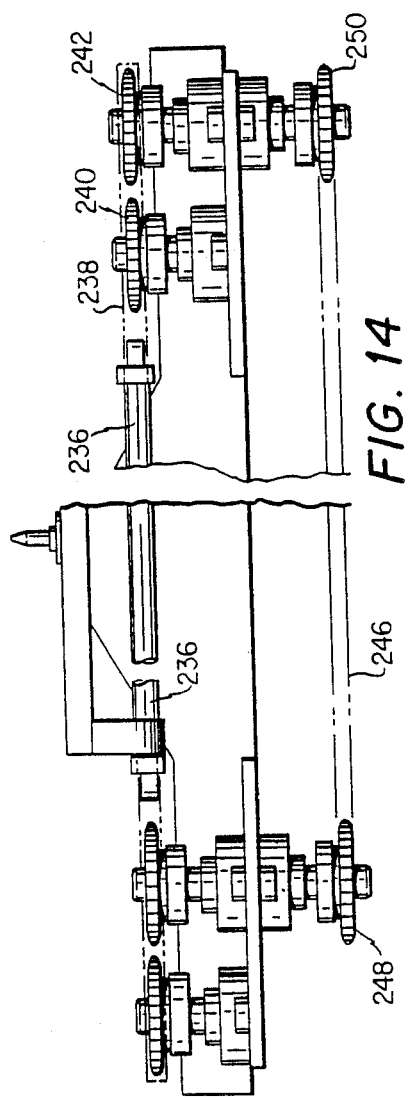
FIG. 14 is an end view illustrating the operation of the chain tensioning mechanism.
Figure 15:
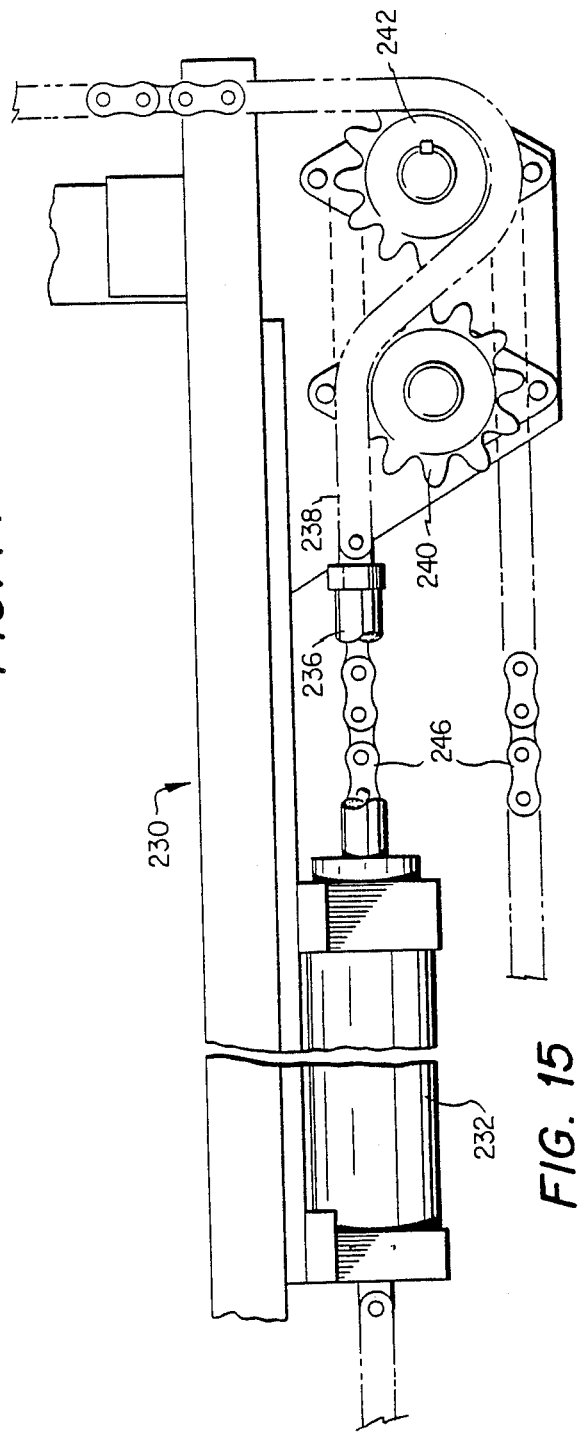
FIG. 15 is an enlargement of a portion of FIG. 13.

It will be appreciated that the conveyor systems 28 and 30 of the proofer 22 and the oven 26, respectively, are at substantially higher temperatures when the continuous proof and bake apparatus 20 is operating as compared with periods of non-operation. FIGS. 13, 14 and 15 illustrate a system 230 for accomodating thermal expansion of the component parts of the conveyor systems 28 and 30. A pair of fluid powered cylinders 232 are mounted on a subframe 234 each cylinder 232 has a piston rod 236 extending therefrom. Chains 238 extend from the piston rods 236 around sprockets 240 and 242. The chains 238 are in turn connected to curved end portions 244 of the track 110.

Referring specifically to FIG. 14, a chain 246 is constrained around sprockets 248 and 250. The sprocket 250 is connected to sprocket 242 at one end of the system 230 and the sprocket 248 is connected to sprocket 240 at the opposite end thereof. The function of the chain 246 is to constrain both ends of the curved end portion 240 of the track 110 to identical movement. Movement of the curved end portion 244 is further constrained by a guide member 252 which engages the curved end portion 244 at the center thereof. Thus, upon operation of the cylinders 232, the curved end portion 244 of the track 110 may be moved inwardly or outwardly to accomodate thermal contraction or thermal expansion of the component parts of the conveyor system.

FIGS. 15 and 16 illustrate a system for lubricating the conveyor chain 70. A U-shaped chamber surrounds a portion of the track 110. The U-shaped chamber 260 supports a plurality of lubricant discharge nozzles 262. A plurality of apertures 264 are formed through the track 110 at points aligned with the discharge from the nozzles 262. Lubricant is directed to the nozzles 262 from a manifold 266 which in turn receives lubricant from a supply line 268. The system is actuated by means of compressed air received through a line 270. The orientation of the conveyor chain 70 relative to the lubrication system is illustrated in FIG. 16.

From the foregoing it will be understood that the present invention comprises a conveyor system that is particularly adapted for use in conjunction with continuous proofer oven apparatus to provide substantial advantages over the prior art. In particular, conveyor systems incorporating the present invention provide substantial improvements in reliabiity, thereby resulting in reduced maintenance costs. Other advantages deriving from the use of the invention will readily suggest themselves to those skilled in the art.

Although preferred embodiments of the invention have been illustrated in the accompaning Drawings and described in the foregoing Detailed Description, it will be understood that the invention is not limited to the embodiments disclosed, but is capable of numerous rearrangements, modifications and substitutions of parts and elements without departing from the spirit of the invention.

We claim:

1. In a system for processing bakery products, an enclosure comprising;
    a plurality of vertically disposed sidewalls;
    a concrete curb for supporting the side walls above the floor of the enclosure to prevent damage to the sidewalls due to accumulations of condensation on the floor of the enclosure;
    a horizontally disposed top wall extending between the upper ends of the side walls;
    means for supporting the top wall for movement along a vertical axis thereby facilitating the release of pressure from the interior of the enclosure in the event of an internal explosion;
    a spiral conveyor system for transporting the bakery goods through the enclosure; and
    a plurality of ladders, each comprising internal and external vertical members adjacent to the interior and exterior perimeters of the spiral conveyor connected by a plurality of horizontal cross members, each of said cross members corresponding to, and supporting a tier of said spiral conveyors.

* * * * *